United States Patent
Huret et al.

[15] 3,677,103
[45] July 18, 1972

[54] GEAR CHANGE FOR BICYCLE OR LIKE MACHINE

[72] Inventors: Jacques Andre Huret; Roger Henri Huret, both of 60, Avenur Felix Faure, Nanterre, Haute de Seine, France

[22] Filed: Dec. 28, 1970

[21] Appl. No.: 101,557

[30] Foreign Application Priority Data

March 3, 1970 France..................................7007559

[52] U.S. Cl..........................................................74/217 B
[51] Int. Cl..............................................................F16h 9/00
[58] Field of Search...............................................74/217 B

[56] References Cited

UNITED STATES PATENTS

| | | | |
|---|---|---|---|
| 3,364,762 | 1/1968 | Maeda | 74/217 B |
| 3,364,763 | 1/1968 | Juy | 74/217 B |
| 3,453,899 | 7/1969 | Tartuania et al. | 74/217 B |

Primary Examiner—C. J. Husar
Attorney—Donnelly, Mentag & Harrington

[57] ABSTRACT

The invention relates to a gear change for bicycle or like machine comprising two rollers linked together by a support, movement of said unit being controlled cross-wise to the free wheel of the bicycle or like machine by means of a control wire, and the support linking the two rollers being made up of two parts articulated one on the other, a spring being positioned between these two parts in order to keep the two rollers constantly separated from each other.

6 Claims, 4 Drawing Figures

PATENTED JUL 18 1972

INVENTORS
JACQUES ANDRÉ HURET
ROGER HENRI HURET

BY Donnelly, Mentag & Harrington

ATTORNEYS

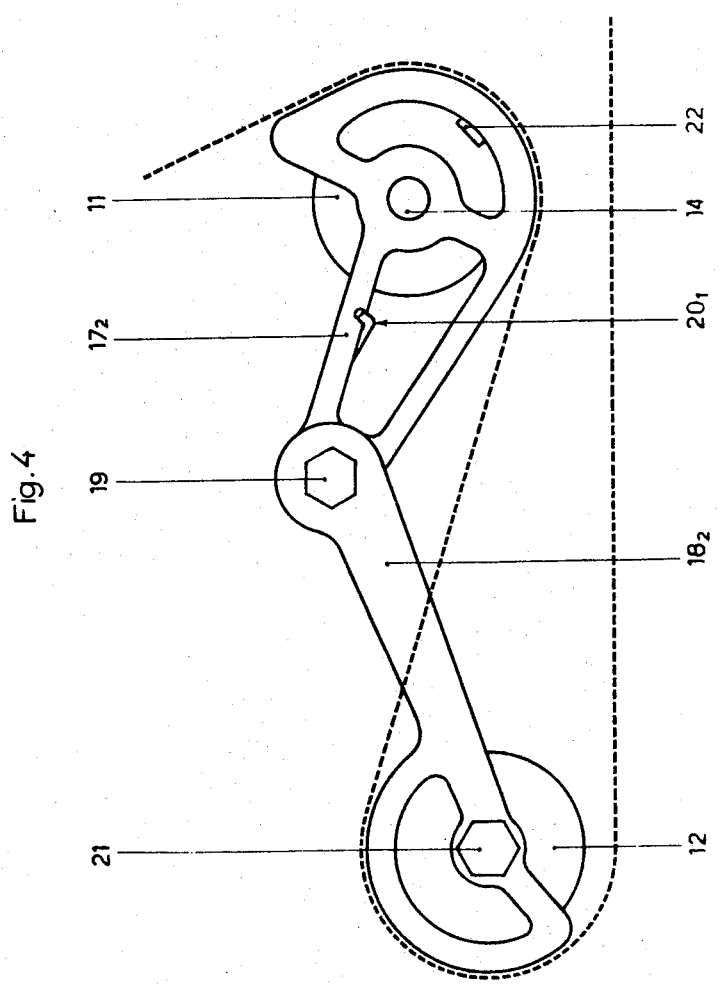

3,677,103

GEAR CHANGE FOR BICYCLE OR LIKE MACHINE

SUMMARY OF THE INVENTION

The invention relates to a gear change for cycle, such as bicycle, motor cycle or like machine, allowing a considerable increase in the gear change ratio.

Gear changes for bicycles, composed basically of two small wheels kept apart at a constant distance by small supporting plates, are already known. These two rollers and their support move cross-wise to the free-wheel drive of the back wheel of the bicycle under the action of a wire, so that the chain passing over the two rollers may be brought into the plane of one or other of the free wheel pinions. When the chain passes from a pinion with a given diameter to a pinion with a different diameter, smaller or greater, the result is a difference in the effective length of the chain, difference which is absorbed by the unit comprising rollers and support plates pivoting around a spindle fitted with a return spring.

This pivoting of the rollers and their support plates is generally on a spindle identical with that of one of the rollers, the other roller always being in a position such that it keeps the driving chain under constant tension under the action of the return spring.

However, in these known gear changes the maximum variation in the gear change ratio, that is to say the maximum difference between the free wheel pinions, is limited since the unit comprising rollers and support plates can absorb only a relatively small difference in the length of the driving chain.

For this reason, up to now the difference in diameter between the largest and smallest free wheel pinion or the difference in diameter between the toothed pedal-gear face-plates has remained relatively small, thus limiting possibilities for the bicycle depending on whether it is traveling on a slope or on a flat road.

For this purpose, this invention relates to a gear change for bicycle or like machine, comprising two rollers linked together by a support, movement of said unit being controlled cross-wise to the free wheel of the bicycle or like machine by means of a control wire, gear change wherein the support linking the rollers is made up of two parts articulated one on the other, a spring being positioned between these two parts in order to keep the two rollers constantly separated from each other.

In accordance with another characteristic of the invention, the unit comprising rollers and their support, made up of two parts articulated one on the other, is mounted on a spindle identical with that of one of the rollers, the distance between this roller and the articulating spindle of the support parts being shorter than that between the other roller and the articulating spindle of the support parts.

In accordance with another characteristic, stops are fitted to restrict articulation of the two support parts articulated one on the other and to prevent the articulating spindle of the two support parts coming into alignment with the spindles of the two rollers.

BRIEF DESCRIPTION OF THE DRAWINGS

The invention is illustrated as a non-limiting example in the accompanying drawings, in which:

FIG. 4 shows the unit in FIGS. 2 and 3 in a position corresponding to the use of the smallest available diameters of pinion and face-plate.

DESCRIPTION OF THE PREFERRED EMBODIMENT

The object of this invention is, consequently, to enable appropriate working of a derailleur gear change even though the free wheel pinions may be of very different diameters and, also, for it to be possible to use several pedal-gear face-plates of very different diameters.

The object of the gear change in accordance with the invention is therefore to absorb an important length of bicycle chain, which becomes unnecessary following the use of smaller diameter free wheel pinions and pedal-gear face-plates.

Figure 1:
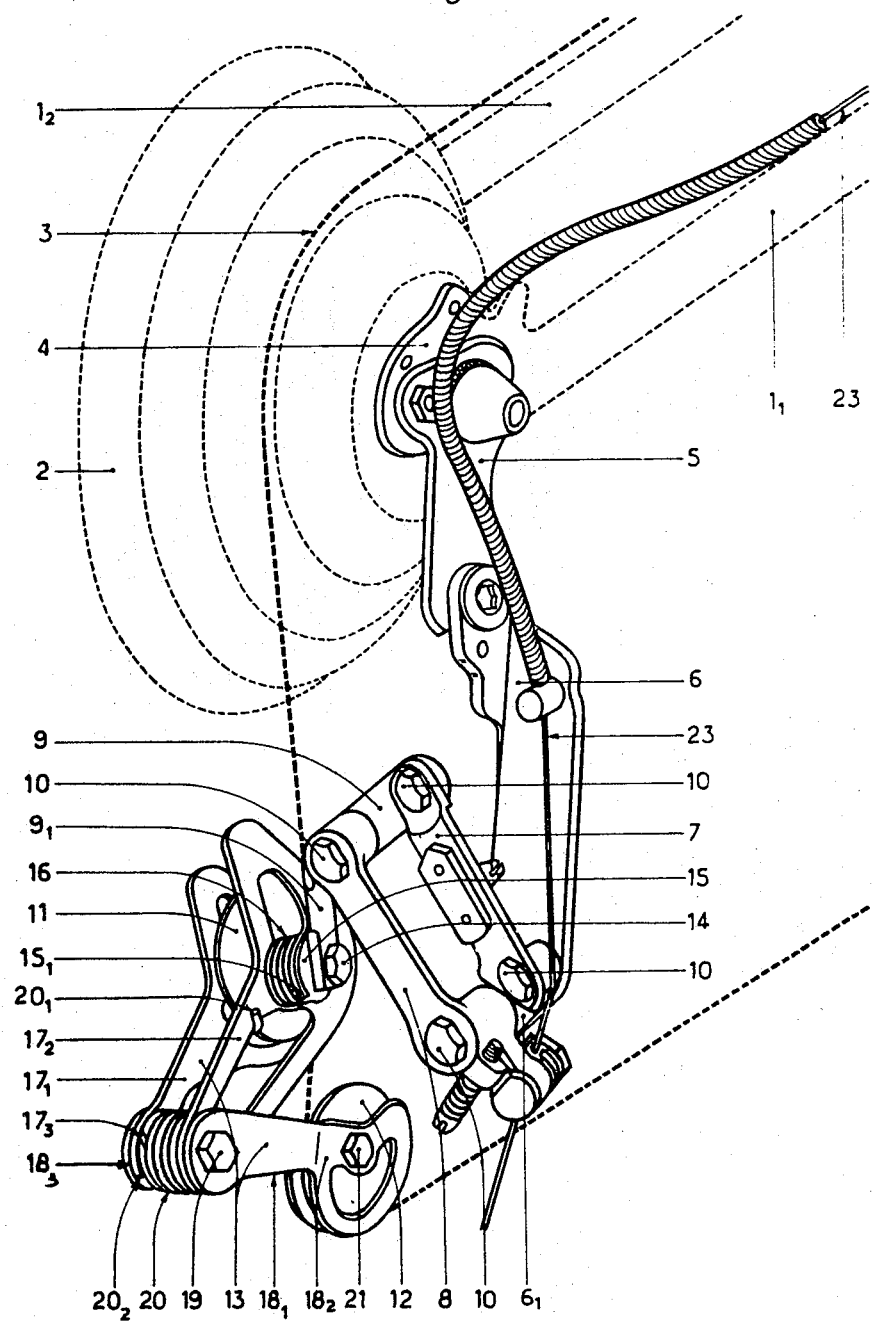
FIG. 1 is a diagrammatic perspective view of a method of producing a gear change in accordance with the invention.

FIG. 1 thus shows the two arms $1_1$, $1_2$ of the rear fork of a bicycle on which is mounted the free wheel 2 with five speed ratios.

The driving chain 3 of this bicycle passes over one or other of these pinions.

The gear change in accordance with the invention is fixed to lug 4 of arm $1_1$ in a way which is itself known.

This gear change is made up of a lug 5 on which is fixed, so that it can be adjusted, a second lug 6. This second lug 6 supports on its lower end a unit shaped like a parallelogram that can be distorted, made up of arms 7, 8, 9 and $6_1$, this latter arm $6_1$ being formed by an extension of lug 6. It should, however, be noted that this parallelogram-shaped unit could be replaced by other devices, themselves known and filling the same role. For example, this distortable parallelogram could be replaced by a sliding horizontal rod pushed by a spring.

The articulations of the various arms of the distortable parallelogram are made up of screws 10 and lug 9 of this parallelogram has an extension $9_1$ on which is mounted a pivoting unit comprising tension rollers 11 and 12 and their support 13, so that this unit is controlled in translation, cross-wise to the free wheel.

This group 11, 12, 13 is mounted on extension $9_1$ by means of a screw 14 which receives in succession a plate 15 fitted with a raised edge forming a stop $15_1$, a return spring 16, then support 13 and roller 11.

In accordance with the invention, support 13 is in two parts, each having two arms $17_1$, $17_2$, $18_1$, $18_2$, articulated one on the other by means of a spindle, in this case formed by connecting screw 19.

A return spring 20, of which one end $20_1$, is hooked to arm $17_2$ and the other $20_2$ fits into a hole in arm $18_1$, is positioned around this screw 19 and between arms $17_1$, $18_1$ and $17_2$, $18_2$.

The roller 12, rotating on spindle 21, is positioned at the edge of the raised edges of arms $18_1$, $18_2$.

Given this construction, it will be seen that the distance separating spindle or screw 14 and 21 is variable, given the articulation of screw 19.

Figure 2:
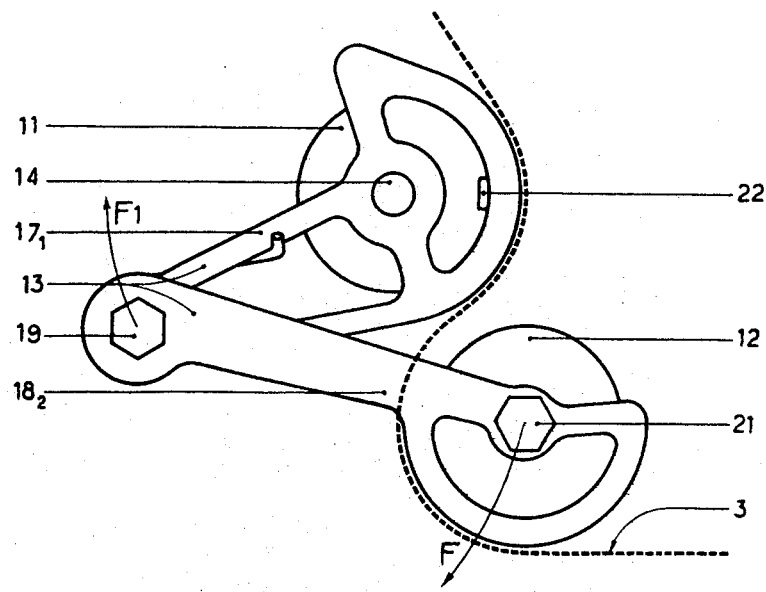
FIG. 2 is an elevation view of the unit comprising rollers and supports for a chain in an initial position.

In addition, the return spring 20 positioned between arms $17_2$ and $18_2$ constantly tends to separate spindle 21 from spindle 14 by making it pivot around spindle 19 in the direction of arrow F (see FIG. 2).

Likewise, spring 16 placed around spindle 14 is engaged at one end with hook 22 (see FIG. 2), while it is immobilized by its other end on extension $9_1$. This spring also tends to make the group comprising roller 11, 12 and support 13 pivot constantly, so that articulating spindle 19 tends to move at practically the same level as spindle 14 and behind it in relation to the direction in which the bicycle advances.

For an extreme gear change position, rollers 11, 12 and support 13 occupy the position illustrated in FIG. 2, and this position corresponds to the largest diameters of the free wheel pinion and pedal-gear face-plate, the distance separating spindles 14 and 21 being the shortest possible.

Figure 3:
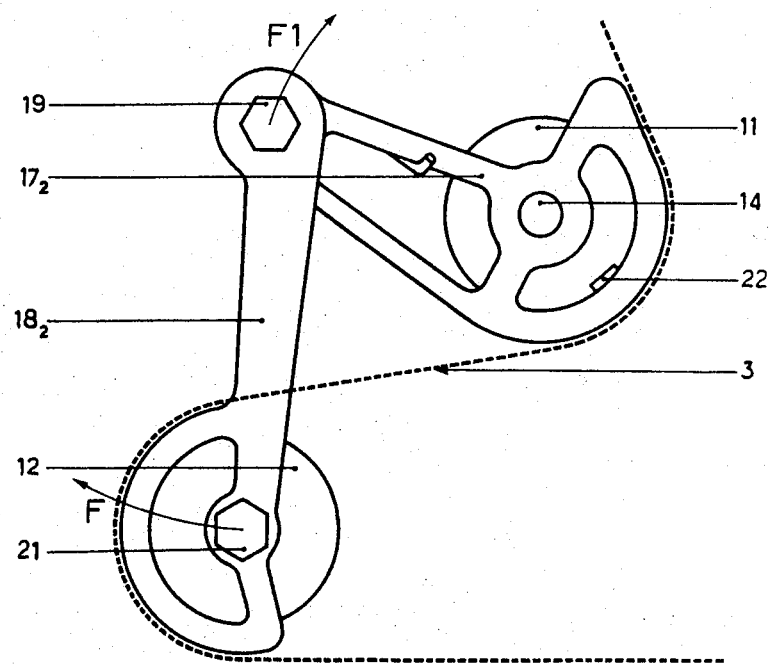
FIG. 3 shows the unit in FIG. 2 in an intermediary gear change ratio.

When the rider operates traction wire 23, he distorts the parallelogram 7, 8, 9, $6_1$ in order to move rollers 11, 12 in translation cross-wise to the pinions of the free wheel 2. This corresponds, for example, to the positioning of chain 3 on a smaller diameter pinion, and the length of chain in this way becoming unnecessary is absorbed by the positioning of rollers 11 and 12 in the manner illustrated in FIG. 3.

In this case, spring 16 has made parts $17_1$ and $17_2$ of the support pivot around spindle 14 in the direction of arrow $F_1$; at the same time, spring 20 has made roller 12 pivot around spindle 19 in the direction of arrow F.

In this position, it will be seen that the distance separating spindles 14 and 21 has increased in order to compensate for the difference in the length of chain necessary, and to keep this chain at constant tension despite the variations in the free wheel pinion diameters used and, possibly, despite the variation in pedal-gear face-plate diameters used.

Lastly, when the smallest free wheel pinion and pedal-gear face-plate diameters are used, articulated support 13 moves into the position shown in FIG. 4 and it will be seen that, for this position, spindle 19 is situated slightly above the line passing through spindles 14 and 21, and that the lower edge of roller 11 is situated above the lower edge of roller 12. This is made possible by stops provided to limit the action of spring 16 controlling the swing of arms $17_1$, $17_2$ around spindle 14 and to limit the swing of arms $18_1$, $18_2$ around articulating spindle 19.

In effect, a stop edge $17_3$ is formed on arm $17_1$; in the position illustrated in FIG. 4, this stop edge $17_3$ comes into contact with a stop $18_3$ on arm $18_1$. Likewise, in this position stop 15 limits the opening of spring 16, one end of which is engaged on hook 22.

With the gear change in accordance with the invention, it will be seen that it is possible to use pinions or gear-change face-plates of very different diameters, given that the difference in the circumference of these pinions or face-plates can be completely absorbed. In effect, the capacity for absorption of the difference in necessary chain length corresponds closely to the maximum of twice the distance separating spindles 14 and 21 in their most distant position (FIG. 4).

In this construction, it will also be noted that arms $18_1$ and $18_2$ are slightly longer than arms $17_1$, $17_2$, so that spindles 14, 21 and 19 occupy a relative position such that springs 16 and 20 have a maximum action whatever the pinion or face-plate used, this relative position of spindles 14, 21 and 19 also being such that roller 11 and 12 absorb the minimum length of chain when the pinion and face-plate used are the largest, and the maximum length of chain when the pinion and face-plate are the smallest.

In effect, it will be noted, in accordance with FIG. 2, that spindle 21 is slightly in front of spindle 14, while spindle 19 is slightly below this spindle 14. On the other hand, in accordance with FIG. 4, spindle 19 is slightly above spindle 14 and slightly above the line through spindles 21 and 14, while the lower edge of roller 11 is slightly above the lower edge of roller 12.

It should be understood that the invention is not limited to the embodiment described and represented above; from this it is possible to foresee other methods and other embodiments which in no way exceed the scope of the invention.

What is claimed is:

1. A gear change unit for a bicycle having a free wheel, comprising two rollers linked together by a support, movement of said unit being controlled cross-wise to the free wheel of the bicycle by means of a control wire, gear change wherein the support linking the rollers is made up of two parts articulated one on the other, a spring being positioned between these two parts in order to keep the two rollers constantly separated from each other.

2. A gear change in accordance with claim 1, wherein the return spring connecting the two parts of the support articulated one on the other is hooked onto each of these parts by each end.

3. A gear change in accordance with claim 1, wherein the unit comprising rollers and their support, made up of two parts articulated one on the other, is mounted on a spindle identical with that of one of the rollers, the distance between this roller and the articulating spindle of the support parts being shorter than the distance between the other roller and the articulating spindle of the support parts.

4. A gear change in accordance with claim 3, wherein a spring is positioned around the pivoting spindle of the unit comprising rollers and support, in order constantly to place the articulating spindle of the two parts of the support behind the roller whose spindle is identical with the pivoting spindle of the unit.

5. A gear change in accordance with claim 4, wherein stops are fitted to restrict articulation of the two support parts articulated one on the other and to prevent the articulation spindle of the two support parts coming into alignment with the spindles of the two rollers.

6. A gear change in accordance with claim 5, wherein one stop is provided near to the pivoting spindle for the unit comprising rollers and support, in order to limit the action of the return spring controlling the pivoting of this unit and to ensure that the lower edge of the roller, whose spindle is identical with the unit's pivoting spindle, is always at a higher level than the lower edge of the other roller.

* * * * *